United States Patent

Wu

(10) Patent No.: US 9,654,401 B2
(45) Date of Patent: May 16, 2017

(54) SYSTEMS AND METHODS FOR MULTIPATH LOAD BALANCING

(71) Applicant: Juniper Networks, Inc., Sunnyvale, CA (US)

(72) Inventor: Qiang Wu, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 174 days.

(21) Appl. No.: 14/229,958

(22) Filed: Mar. 30, 2014

(65) Prior Publication Data

US 2015/0281088 A1 Oct. 1, 2015

(51) Int. Cl.
*H04L 12/803* (2013.01)
*H04L 12/729* (2013.01)
*H04L 12/707* (2013.01)

(52) U.S. Cl.
CPC .......... *H04L 47/125* (2013.01); *H04L 45/125* (2013.01); *H04L 45/24* (2013.01)

(58) Field of Classification Search
CPC ...... H04L 47/125; H04L 45/24; H04L 45/125
See application file for complete search history.

(56) References Cited

U.S. PATENT DOCUMENTS

| | | | | |
|---|---|---|---|---|
| 6,370,119 B1 * | 4/2002 | Basso | ...................... | H04L 45/12 370/252 |
| 6,697,333 B1 * | 2/2004 | Bawa | ...................... | H04L 45/10 370/238 |
| 7,072,304 B2 * | 7/2006 | Ng | ........................ | H04L 45/123 370/238 |
| 8,787,400 B1 * | 7/2014 | Barth | ...................... | H04L 45/24 370/419 |
| 2005/0195835 A1 * | 9/2005 | Savage | ............... | H04L 12/2602 370/401 |
| 2006/0062211 A1 | 3/2006 | Manthoulis et al. | | |
| 2008/0212584 A1 | 9/2008 | Breslau et al. | | |
| 2011/0231833 A1 * | 9/2011 | Narayanan | ................ | G06F 8/67 717/171 |
| 2011/0255421 A1 | 10/2011 | Shrirang et al. | | |
| 2011/0280159 A1 | 11/2011 | Miller | | |

(Continued)

FOREIGN PATENT DOCUMENTS

EP 2658192 10/2013

OTHER PUBLICATIONS

Apoorva Jindal, et al; Systems and Methods for Increasing the Scalability of Software-Defined Networks; U.S. Appl. No. 13/936,033, filed Jul. 5, 2013.

(Continued)

*Primary Examiner* — Christopher Grey
(74) *Attorney, Agent, or Firm* — FisherBroyles, LLP

(57) ABSTRACT

A computer-implemented method for multipath load balancing may include (1) identifying a plurality of paths from a source switch to a destination switch, (2) determining, for each of the plurality of paths, a limiting bandwidth of the path based at least in part on the lowest link bandwidth of one or more data links in the path, and (3) balancing network traffic that is transmitted from the source switch to the destination switch across the plurality of paths based at least in part on the limiting bandwidth of each of the plurality of paths. Various other methods, systems, and computer-readable media are also disclosed.

18 Claims, 7 Drawing Sheets

(56) References Cited

U.S. PATENT DOCUMENTS

2013/0286817 A1    10/2013    Allan
2014/0056178 A1    2/2014     Tsai et al.
2014/0071987 A1    3/2014     Janardhanan et al.

OTHER PUBLICATIONS

Anuj Anand Mittal, et al; Systems and Methods for Testing and Analyzing Controller Networks; U.S. Appl. No. 13/901,554, filed May 23, 2013.

Kent A. Watsen; Systems and Methods for Managing Device Configurations at Various Levels of Abstraction; U.S. Appl. No. 14/040,593, filed Sep. 27, 2013.

Jian Chen, et al; Systems and Methods for Preventing Split-Brain Scenarios in High-Availability Clusters; U.S. Appl. No. 14/146,804, filed Jan. 3, 2014.

Kamatchi Soundaram Gopalakrishnan; Systems and Methods for Improving Clock Synchronization Between Master and Slave Devices; U.S. Appl. No. 14/146,830, filed Jan. 3, 2014.

Craig R. Frink, et al; Apparatus, System, and Method for Increasing Scheduling Efficiency in Network Devices; U.S. Appl. No. 14/146,914, filed Jan. 3, 2014.

Eswaran Srinivasan, et al; Systems and Methods for Mitigating Network Congestion; U.S. Appl. No. 14/146,864, filed Jan. 3, 2014.

"A New Cloud Network "Spline™" Is Born", http://www.aristanetworks.com/en/blogs/?p=907, as accessed Feb. 12, 2014, Arista Networks, Inc., (Nov. 4, 2013).

Apoorva Jindal, et al.; Systems and Methods for Interfacing Software-Defined Networks With Non-Software-Defined Networks; U.S. Appl. No. 14/231,493, filed Mar. 31, 2014.

Qiang Wu, et al.; Systems and Methods for Load Balancing Multicast Traffic; U.S. Appl. No. 14/231,225, filed Mar. 31, 2014.

\* cited by examiner

SYSTEMS AND METHODS FOR MULTIPATH LOAD BALANCING

BACKGROUND

Traditional techniques for distributing traffic within layer-2 networks have generally relied on link-state routing protocols to identify a path (e.g., a shortest path or a lowest cost path) on which to transmit traffic between two switches within a network. Unfortunately, many link-state routing protocols may constrain traffic transmitted between two switches within a network to a single set of data links, which may cause redundant data links to be unused. The instant disclosure, therefore, identifies and addresses a need for systems and methods for multipath load balancing.

SUMMARY

As will be described in greater detail below, the instant disclosure generally relates to systems and methods for load balancing network traffic across multiple paths that interconnect two switches within a network, such as a network of switches that make up a virtual-chassis fabric. In one example, a computer-implemented method for multipath load balancing may include (1) identifying a plurality of paths from a source switch to a destination switch, (2) determining, for each of the plurality of paths, a limiting bandwidth of the path based at least in part on the lowest link bandwidth of one or more data links in the path, and (3) balancing network traffic that is transmitted from the source switch to the destination switch across the plurality of paths based at least in part on the limiting bandwidth of each of the plurality of paths.

Similarly, a system incorporating the above-described method may include (1) an identifying module that identifies a plurality of paths from a source switch to a destination switch, (2) a determining module that determines, for each of the plurality of paths, a limiting bandwidth of the path based at least in part on the lowest link bandwidth of one or more data links in the path, (3) a balancing module that balances network traffic that is transmitted from the source switch to the destination switch across the plurality of paths based at least in part on the limiting bandwidth of each of the plurality of paths, and (4) at least one physical processor that executes the identifying module, the determining module, and the balancing module.

A corresponding non-transitory computer-readable medium may include one or more computer-readable instructions that may, when executed by at least one processor of a network device, cause the network device to (1) identify a plurality of paths from a source switch to a destination switch, (2) determine, for each of the plurality of paths, a limiting bandwidth of the path based at least in part on the lowest link bandwidth of one or more data links in the path, and (3) balance network traffic that is transmitted from the source switch to the destination switch across the plurality of paths based at least in part on the limiting bandwidth of each of the plurality of paths.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
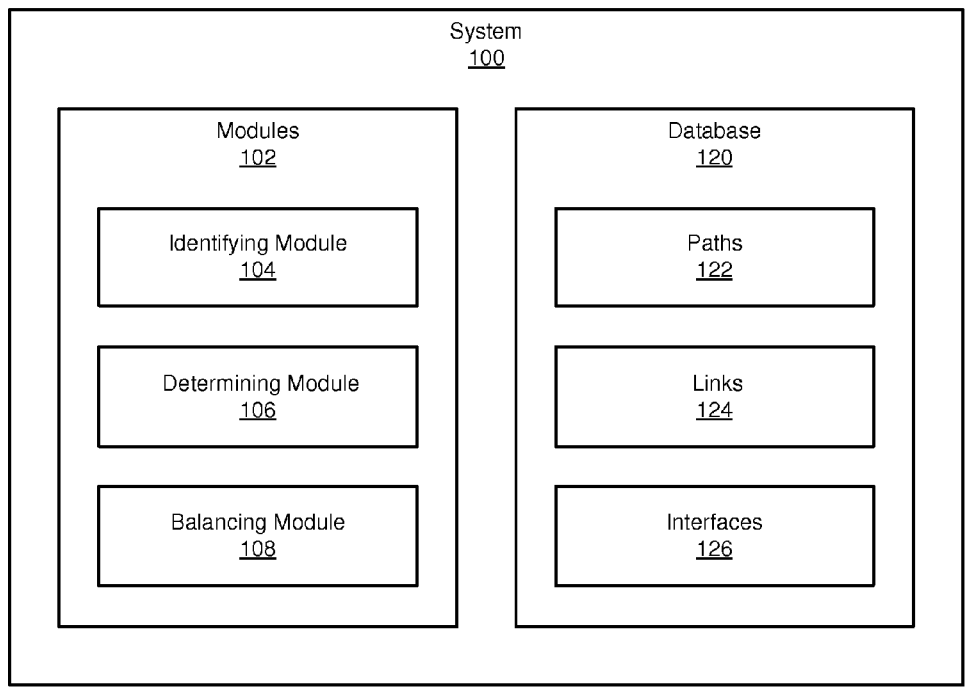
FIG. 1 is a block diagram of an exemplary system for multipath load balancing.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for load balancing network traffic across multiple paths that interconnect two switches within a network, such as a network of switches that make up a virtual-chassis fabric. Embodiments of the instant disclosure may balance network traffic across multiple paths that interconnect two switches in a network by (1) identifying two or more paths that interconnect the two switches, (2) determining a limiting bandwidth for each path based on the link bandwidths of the data links that make up each path, and (3) balancing the network traffic across the paths based on the limiting bandwidths of the paths.

As will be explained in greater detail below, by load balancing the network traffic transmitted between two switches using multiple paths, embodiments of the instant disclosure may substantially improve data-link and/or path utilization. Moreover, by load balancing network traffic across multiple paths based on the limiting bandwidths of the paths, embodiments of the instant disclosure may prevent any of the data-links that make up the paths from becoming a bottleneck to network traffic, especially in networks with asymmetric topologies. Embodiments of the instant disclosure may also provide various other advantages and features, as discussed in greater detail below.

The following will provide, with reference to FIGS. 1-3, 5, and 6 detailed descriptions of exemplary systems for multipath load balancing. Detailed descriptions of corresponding computer-implemented methods will also be provided in connection with FIG. 4. In addition, detailed descriptions of an exemplary computing system capable of implementing one or more of the embodiments described herein will be provided in connection with FIG. 7.

FIG. 1 is a block diagram of an exemplary system 100 for multipath load balancing. As illustrated in this figure, exemplary system 100 may include one or more modules 102 for performing one or more tasks. For example, and as will be explained in greater detail below, exemplary system 100 may include an identifying module 104 that identifies a plurality of paths from a source switch to a destination switch. Exemplary system 100 may also include determining module 106 that determines, for each of the plurality of paths, a limiting bandwidth of the path based at least in part on the lowest link bandwidth of one or more data links in the path.

In addition, and as will be described in greater detail below, exemplary system 100 may include a balancing module 108 that balances network traffic that is transmitted from the source switch to the destination switch across the plurality of paths based at least in part on the limiting bandwidth of each of the plurality of paths. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., switches 202-208) and/or computing system 700 in FIG. 7. One or more of modules 102 in FIG. 1 may also represent all or portions of one or more special-purpose computers configured to perform one or more tasks. In at least one example, one or more of modules 102 in FIG. 1 may represent all or portions of a system that load balances traffic across the data links and/or paths that interconnect a network of switches that make up a virtual-chassis fabric (e.g., a collection of switches that behave as a single logical switch).

As illustrated in FIG. 1, exemplary system 100 may also include one or more databases, such as database 120. In one example, database 120 may include, paths 122 for storing information about the paths that connect the switches within a network, data links 124 for storing information about the data links that make up the paths, and interfaces 126 for storing information about one or more of the interfaces of the switches that connect to the paths. In at least one example, database 120 may represent all or portion of a link-state database.

Database 120 may represent portions of a single database or computing device or a plurality of databases or computing devices. For example, database 120 may represent a portion of switches 202-208 in FIG. 2 and/or computing system 700 in FIG. 7. Alternatively, database 120 in FIG. 1 may represent one or more physically separate devices capable of being accessed by a computing device, such as switches 202-208 in FIG. 2 and/or computing system 700 in FIG. 7. In at least one example, database 120 may represent control plane data, which may include any type or form of data or code related to controlling the movement of packets within a network of switches.

Figure 2:
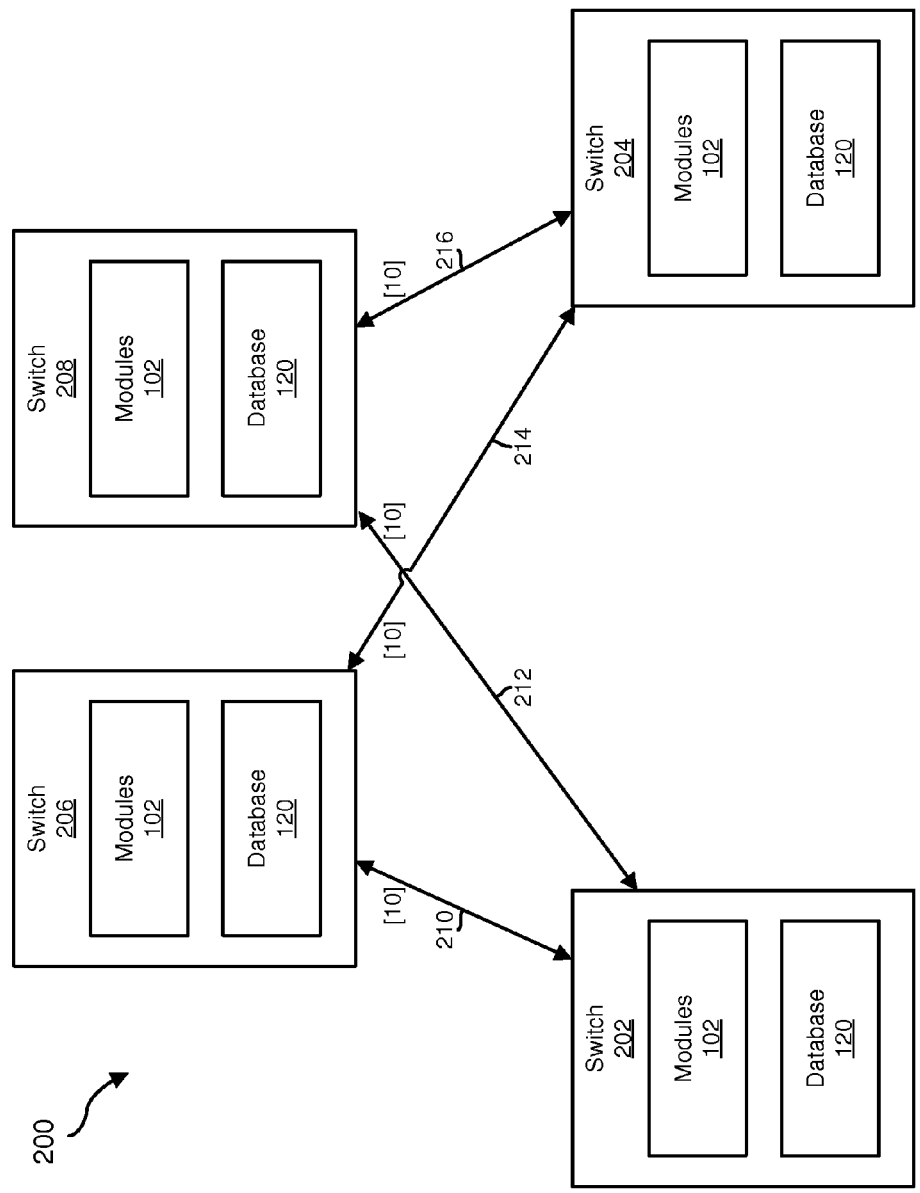
FIG. 2 is a block diagram of an exemplary system for multipath load balancing.
Figure 3:
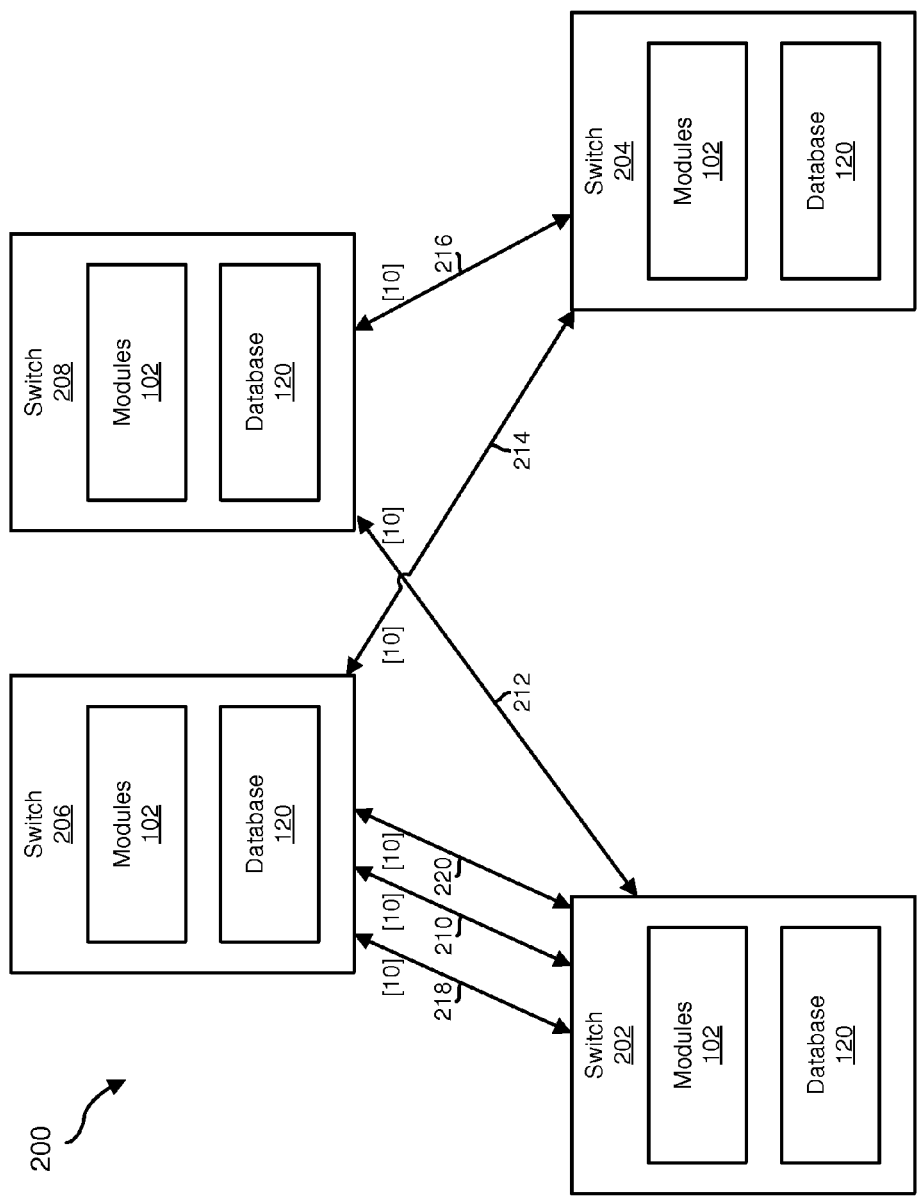
FIG. 3 is a block diagram of an exemplary system for multipath load balancing.

Exemplary system 100 in FIG. 1 may be implemented in a variety of ways. For example, all or a portion of exemplary system 100 may represent portions of exemplary network 200 in FIG. 2. As shown in FIGS. 2 and 3, network 200 may include switches 202-208 interconnected via one or more data links 210-220. In some examples, one or more of switches 202-208 may be programmed with one or more of modules 102 and/or may store all or a portion of the data in database 120.

In one embodiment, one or more of modules 102 from FIG. 1 may, when executed by at least one processor of switches 202-208, cause one or more of switches 202-208 to load balance traffic across data links 210-220. For example, and as will be described in greater detail below, one or more of modules 102 may cause one or more of switches 202-208 to (1) identify every valid path from switch 202 to switch 204, (2) determine, for each of the identified paths, a limiting bandwidth of the path based at least in part on the lowest link bandwidth of one or more data links in the path, and (3) balance network traffic that is transmitted from switch 202 to switch 204 across the identified paths based at least in part on the limiting bandwidth of each of the paths.

Switches 202-208 generally represent any intermediary computing device that connects network segments or network devices and/or facilitates communication between two or more other computing devices within a computing environment. Examples of switches 202-208 include, without limitation, packet switches, network bridges, multilayer switches, network hubs, signal repeaters, routers, and/or any other suitable switching devices. In some examples, switches 202-208 may represent all or a portion of a layer-2 network. In at least one example, switches 202-208 may represent a virtual-chassis fabric.

Figure 6:
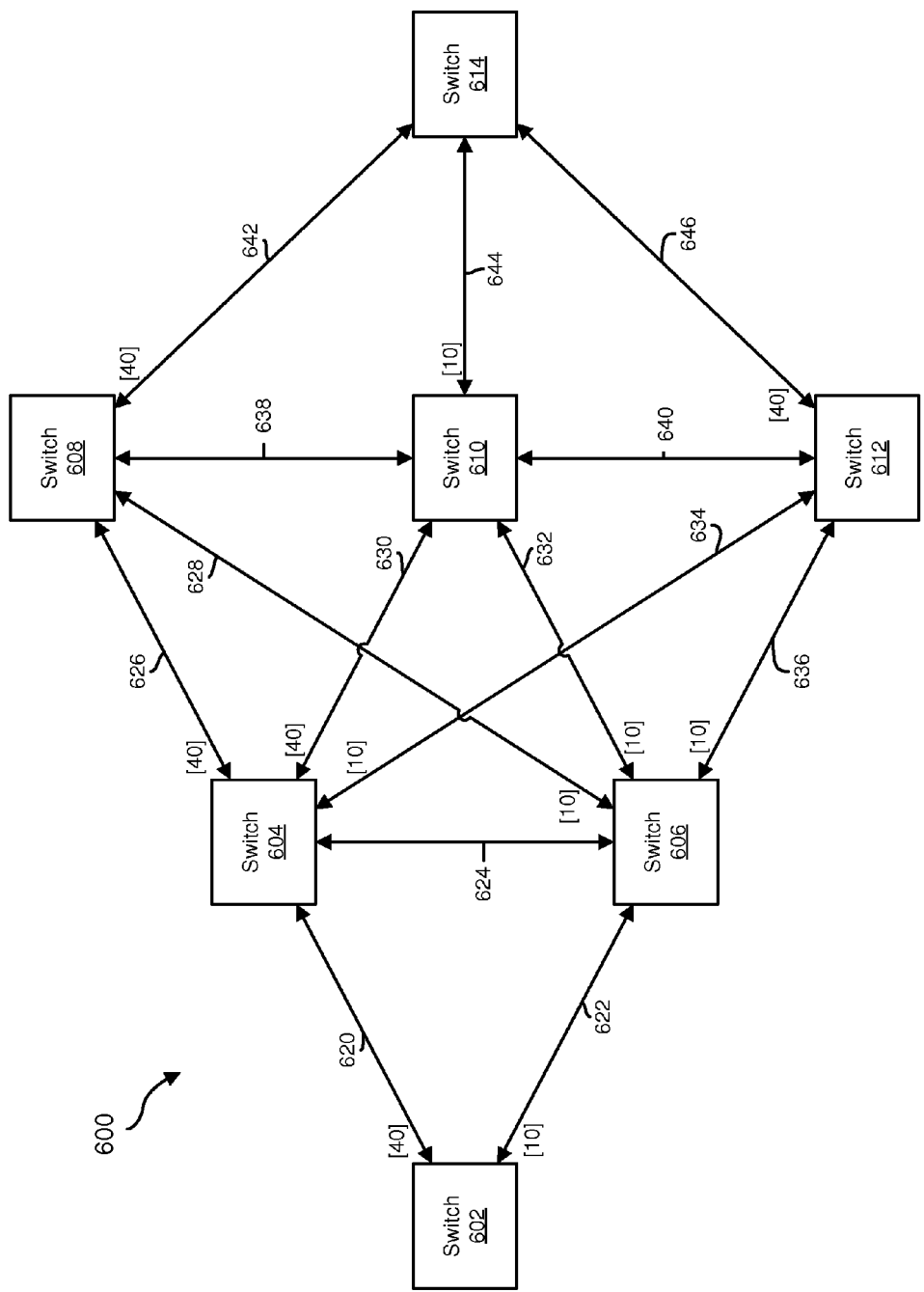
FIG. 6 is a block diagram of an exemplary system for multipath load balancing.

As shown in FIGS. 2 and 3, switches 202-208 may be interconnected via data links 210-220. Data links 210-220 generally represent any medium or architecture capable of facilitating communication or data transfer. Each of data links 210-220 may represent a physical connection (e.g., via a wire or cable) between the data ports of two switches in network 200. FIG. 2 illustrates a symmetric topology of network 200. As used herein, the phrase "symmetric topology" may generally refer to any network a topology where multiple paths between any two switches within the network have identical or similar characteristics, such as bandwidths, number of hops, or number of data links per path segment. FIG. 3 illustrates an asymmetric topology of network 200. As used herein, the phrase "asymmetric topology" generally refers to any network topology where multiple paths between any two switches within the network have dissimilar characteristics. FIG. 6 also provides an illustration of an exemplary network 600 with an asymmetric topology.

Figure 4:
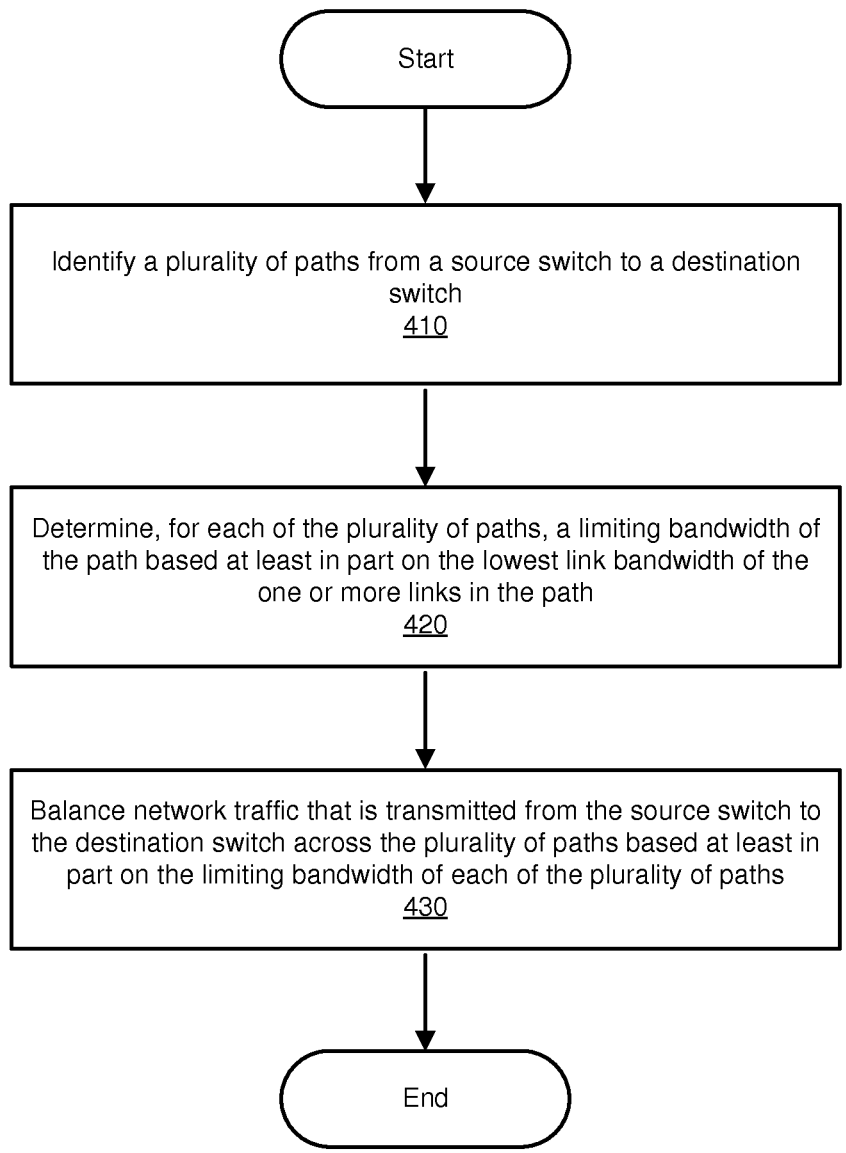
FIG. 4 is a flow diagram of an exemplary method for multipath load balancing.

FIG. 4 is a flow diagram of an exemplary computer-implemented method 400 for multipath load balancing. The steps shown in FIG. 4 may be performed by any suitable computer-executable code and/or computing system. In some embodiments, the steps shown in FIG. 4 may be performed by one or more of the components of system 100 in FIG. 1, network 200 in FIG. 2, network 600 in FIG. 6, and/or computing system 700 in FIG. 7.

As illustrated in FIG. 4, at step 410 one or more of the systems described herein may identify a plurality of paths from a source switch to a destination switch. For example, at step 410 identifying module 104 may, as part of switch 202 in FIG. 3, identify the path that connects switches 202 and 204 through switch 206 via data links 210, 214, 218, and 220 and the path that connects switches 202 and 204 through switch 208 via data links 212 and 216.

As used herein, the term "switch" generally refers to any device, system, or application capable of routing or forwarding information, which may be in the form of packets, among devices of a computing network. The phrase "source switch," as used herein, may refer to a switch within a network at which data is received and from which data is forwarded, and the phrase "destination switch," as used herein, may refer to a switch within a network to which data is forwarded.

A source switch and a destination switch in a network may be connected via one or more paths. The term "path," as used herein may refer to any route between two devices in a network that may be used by one of the two devices to forward network traffic to the other device. In some examples, the term "path" may refer to a shortest path, a lowest cost path, and/or an equal cost path. In general, a path may be made up of one or more data links. Using FIG. 2 as an example, switch 202 may be connected to switch 204 by a path through switch 206 via data links 210 and 214 and a path through switch 208 via data links 212 and 216. Moreover, a segment of a path may be made up of one or more data links. Using FIG. 3 as an example, switch 202 may be connected to switch 204 via a path segment between switches 202 and 206 that includes data links 210, 218, and 220.

In some examples, two paths may share a data link. Using network 600 in FIG. 6 as an example, switch 602 may be connected to switch 614 by at least two paths that share data link 644 (e.g., the path through switches 604 and 610 via data links 620, 630, and 644 and the path through switches 606 and 610 via data links 622, 632, and 644).

As used herein, the phrase "data link" may refer to any physical or logical connection between two devices in a network. For example, the phrase "data link" may refer to the physical connection between two devices whose physical ports are connected via a physical wire or cable. Examples of data links include data links 210-220 in FIGS. 2 and 3 and data links 620-646 in FIG. 6.

A data link may have a link bandwidth. As used herein, the phrase "link bandwidth" may generally refer to a measurement of the amount of information that may be passed through a data link in a given amount of time, often expressed in gigabits per second (Gb/s). In FIGS. 2, 3, and 6, the bracketed number next to each data link may represent the link bandwidth, in Gb/s, of the data link. As shown in FIG. 3, each of data links 210-220 may have a bandwidth of 10 Gb/s. As shown in FIG. 6, each of data links 620, 626, 630, 642, and 646 may have a bandwidth of 40 Gb/s, and each of data links 622, 628, 632, 634, 636, and 644 may have a bandwidth of 10 Gb/s. In some examples, a data link's bandwidth may be affected by the bandwidths of the switches and/or physical connections that make up the data link.

In some situations, multiple switches may be combined to form a virtual-chassis fabric (e.g., a virtual switch fabric) that may behave as a single logical switch. As used herein, the phrase "virtual-chassis fabric" generally refers to a collection of interconnected switches that may function and/or be managed as a single, logical device. In general, the switches within a virtual-chassis fabric may interconnect incoming data from ingress ports of the virtual-chassis fabric to egress ports of the virtual-chassis fabric. In some instances, a virtual-chassis fabric may facilitate a high level of scalability by providing any-to-any connectivity among nodes (e.g., switches) within the virtual-chassis fabric. Moreover, a virtual-chassis fabric may facilitate high availability by providing redundant switches and/or redundant data links and/or paths. In some examples, the topology of the switches that make up a virtual-chassis fabric may not be restricted.

Returning to FIG. 4, the systems described herein may perform step 410 in a variety of ways. In one example, identifying module 104 may identify all valid forwarding paths from each switch in a network to every other switch in the network. In another example, identifying module 104 may identify all shortest paths, all lowest-cost paths, and/or all equal-cost paths from each switch in a network to every other switch in the network.

In one example, identifying module 104 may, as part of one or more of the switches within a network, use a suitable link-state routing protocol (such as, e.g., Intermediate System to Intermediate System (IS-IS)) to exchange and accumulate topology information (e.g., link bandwidths) that may be used to identify paths. Using FIG. 3 as an example, identifying module 104 may, as part of each of switches 202-208, use a suitable link-state routing protocol to exchange and accumulate topology information that identifies each of switches 202-208 and that describes how switches 202-208 are connected by data links 210-220.

In some examples, identifying module 104 may identify multiple paths from a source switch to a destination switch by calculating the paths. In at least one example, identifying module 104 may calculate multiple paths that connect two switches using a shortest path algorithm (such as, e.g., Dijkstra's algorithm). In some examples, identifying module 104 may calculate two or more equal-cost paths from a source switch to a destination switch. In at least one example, identifying module 104 may allow two or more paths to share a data link. In at least one example, identifying module 104 may calculate paths such that a path's bandwidth and/or the number of hops in a path is taken into consideration.

In some examples, identifying module 104 may, as part of a source switch within a network, (1) identify each destination switch within the network and (2) each path that interconnects the source switch to the destination switch. In some examples, identifying module 104 may store, for each identified destination switch, the paths that connect the source switch to the destination switch as a list of the interfaces of the source switch that are connected to the paths. As used herein, the term "interface" may refer to a physical or logical point of interconnection between a switch and another device (e.g., another switch). In some examples, the term "interface" may refer to a switch's point of connection to a data link or path. As will be explained in greater detail below, when a source switch receives data that should be forwarded to a destination switch, the source switch may select one or more of the interfaces in the list of interfaces associated with the destination switch to forward the data to the destination switch.

In some examples, identifying module 104 may identify multiple paths from a source switch to a destination switch using the exemplary algorithm in Table 1.

TABLE 1

Let G denote a virtual-chassis fabric
Let N denote a switch
for each N in G do
   if N is the source switch then
      N.metric ← 0

TABLE 1-continued

```
        else
            N.metric ← ∞
        end if
        clear interface list of N
        add N to node list L
    end for
while L is not empty do
    Remove the node N with minimum metric in L.
    At this point, routing decision from the source switch to N is final, therefore, do the
    following:
    1) calculate aggregate bandwidth from the source switch to N; and
    2) build an output interface list for N.
    There can be multiple paths from the source switch to N, each with a limiting
    bandwidth. Aggregate bandwidth is set to the sum of the limiting bandwidths of all
    paths from the source switch to N. In each path, interface weights are set to (interface
    bandwidth) / (the sum of the interface bandwidths of all interfaces that connect to the
    path).
    When building the output interface list, add each interface that connects to at least
    one path to the list with its interface weight equal to (interface weight in path) * (path
    bandwidth) / (aggregate bandwidth). When an interface is on multiple paths, its
    interface weight is the sum of all of its individual interface weights in each path.
    The output interface list on the source switch for N is final. A traffic distribution ratio
    on each interface is set to (interface weight) / (sum of all interface weights in the list).
    for each neighbor switch M that is directly connected to N do
        if M ∈ L then
            if M.metric < N.metric + 1 then
                M can be reached by the source switch from a better path, do
                nothing
            else
                if M.metric == 0 N.metric + 1 then
                    The path from N to M has the same cost as previously
                    discovered path(s) from the source switch to M. Thus
                    compare the aggregate bandwidth from the source switch
                    to N and bandwidth from N to M, the smaller bandwidth
                    is the limiting bandwidth from the source switch to M via
                    N. Build a new path with path bandwidth set to limiting
                    bandwidth and add the output interface list calculated for
                    N at the beginning of this iteration into the new path
                    with corresponding computed interface weights.
                else
                    if N.metric == 0 then
                        N is the source switch. Build a new path with path
                        bandwidth set to bandwidth from N to M, add all
                        interfaces on N that can reach M to the path with
                        each interface weight set to (interface bandwidth)
                        / (sum of interface bandwidth in this path).
                    else
                        The forwarding path from N to M is the best path
                        discovered so far. Thus, empty the interface list
                        and path list (if any) that the source switch uses to
                        send traffic to M. Build a new path with path
                        bandwidth set to the smaller value between
                        aggregate bandwidth from the source switch to N
                        and the bandwidth from N to M. Add the output
                        interface list of N to this path with all computed
                        interface weights.
                    end if
                    M.metric ← N.metric + 1
                end if
            end if
        end if
    end for
end while
```

Returning to FIG. 4, at step 420 one or more of the systems described herein may determine, for each of the plurality of paths, a limiting bandwidth of the path based at least in part on the lowest link bandwidth of the one or more data links in the path. For example, at step 420 determining module 106 may, as part of switch 202 in FIG. 3, determine, for each path that connects switch 202 to switch 204, a limiting bandwidth of the path based on the lowest link bandwidth of the one or more data links in the path.

As used herein, the phrase "limiting bandwidth" may refer to any measurement of the amount of information that may be passed through a path in a given amount of time, often expressed in gigabits per second (Gb/s). Because a path may be made up of multiple data links, the limiting bandwidth of a path may be equal to the link bandwidth of the data link in the path with the lowest link bandwidth. In the event, that a segment of a path includes more than one data link (e.g., the path segment between switches 202 and 206 in FIG. 3 may include data links 210, 218, and 220 and the path segment between the switches 602 and 612 may include data links 620, 634, 622, and 636) the limiting bandwidth of the path may be equal to the bandwidth of the segment in the path with the lowest aggregate link bandwidth.

The systems described herein may perform step 420 in a variety of ways. In one example, determining module 106 may assign a limiting bandwidth to a path by (1) identifying each data link in the path, (2) determining which data link in the path has the lowest link bandwidth, and (3) assigning a limiting bandwidth to the path that is equal to the link bandwidth of the data link in the path with the lowest link bandwidth. Using FIG. 2 as an example, balancing module 108 may assign a limiting bandwidth equal to 10 Gb/s to the path that connects switch 202 to switch 204 via switch 206 in response to determining that data links 210 and 214 each have a link bandwidth equal to 10 Gb/s.

In some examples, determining module 106 may assign a limiting bandwidth to a path by (1) identifying each segment in the path, (2) determining which segment in the path has the lowest aggregate link bandwidth, and (3) assigning a limiting bandwidth to the path that is equal to the aggregate link bandwidth of the segment in the path with the lowest aggregate link bandwidth. Using FIG. 3 as an example, determining module 106 may assign a limiting bandwidth that is equal to 10 Gb/s to the path that connects switch 202 to switch 204 via switch 206 (e.g., the path made up of data links 210, 214, 218, and 220) in response to determining that the segment in the path that includes data link 214 has a lower aggregate link bandwidth (in this example, 10 Gb/s) than the segment in the path that includes data links 210, 218, and 220 (in this example, 30 Gb/s). Using FIG. 6 as an additional example, determining module 106 may assign a limiting bandwidth that is equal to 10 Gb/s to the path that connects switch 602 to switch 614 via switches 604 and 612 (e.g., the path made up of data links 620, 634, and 646) in response to determining that the segment in the path that includes data link 634 has a lower aggregate link bandwidth (in this example, 10 Gb/s) than the segment in the path that includes data link 620 (in this example, 40 Gb/s) or the segment in the path that includes data link 646 (in this example, 40 G b/s).

In at least one example, determining module 106 may determine a limiting bandwidth for a path as part of identifying the path. Additionally or alternatively, determining module 106 may determine a limiting bandwidth for a path as part of calculating the path. In some examples, determining module 106 may determine a limiting bandwidth for a path using the algorithm in Table 1.

At step 430, one or more of the systems described herein may balance network traffic that is transmitted from the source switch to the destination switch across the plurality of paths based at least in part on the limiting bandwidth of each of the plurality of paths. For example, at step 430 balancing module 108 may, as part of switch 202 in FIG. 3, balance network traffic that is transmitted from switch 202 to switch 204 across (1) the path that connects switch 202 to switch 204 via switch 206 and (2) the path that connects switch 202 to switch 204 via switch 208 based at least in part on the limiting bandwidth of each of the paths.

The systems described herein may perform step 430 in a variety of ways. In general, balancing module 108 may balance the network traffic that is transmitted from a source switch to a destination switch across multiple paths that connect the source switch and the destination switch by transmitting a portion of the network traffic across each path in proportion to the path's limiting bandwidth. In some examples, balancing module 108 may allocate the amount of the network traffic that is to be transmitted from the source switch to the destination switch on a path based on a path weight assigned to the path or an interface weight assigned to an interface of the source switch that connects to the path.

For example, when a source switch receives data that should be forwarded to a destination switch, the source switch may select one or more paths or interfaces to forward the data to the destination switch based on the weights assigned to the paths and/or interfaces.

In one example, balancing module 108 may assign a path weight to a path that connects a source switch to a destination switch based at least in part on a ratio of the limiting bandwidth of the path to a sum of the limiting bandwidths of all paths that connect the source switch to the destination switch. After assigning a path weight to each path, balancing module 108 may use the path weight assigned to each path to determine how much of the network traffic that is forwarded from the source switch to the destination switch should be forwarded via the path. As used herein, the phrase "path weight" may refer to any value that may be assigned to a path that indicates how much network traffic should be transmitted between a source switch and a destination switch via the path in order to balance the network traffic across the paths and/or data links that connect the source switch with the destination switch.

In general, balancing module 108 may assign a path weight to a path that connects a source switch to a destination switch that is equal to the ratio of the limiting bandwidth of the path to the sum of the limiting bandwidths of all paths that connect the source switch to the destination switch such that the path weight of the path indicates a percentage of the network traffic received at the source switch that should be transmitted to the destination switch via the path. When a source switch receives data that should be forwarded to a destination switch, the source switch may select one or more paths that connect the source switch to the destination switch on which to forward the data to the destination switch based on the path weights assigned to the paths.

Using FIG. 3 as an example, balancing module 108 may assign a path weight to the path that connects switch 202 to switch 204 via switch 206 and a path weight to the path that connects switch 202 to switch 204 via switch 208 by first determining the limiting bandwidths of each of the paths (in this example, 10 Gb/s). Next, balancing module 108 may determine that the sum of the limiting bandwidths of these paths is equal to 20 Gb/s (in this example, 10 Gb/s+10 Gb/s=20 Gb/s). Balancing module 108 may then assign a path weight to the two paths that is equal to ½ after determining that the ratio of the limiting bandwidth of each path to the sum of the limiting bandwidths of the two paths is equal to ½ (in this example, 10 Gb/s/20 Gb/s=½). In this example, balancing module 108 may, as part of switch 202, use the path weights to determine that 50% of the network traffic transmitted from switch 202 to switch 204 should be transmitted via each of the paths that connects switch 202 to switch 204.

In some examples, balancing module 108 may assign an interface weight that is associated with a particular destination switch to each interface of a source switch. For example, balancing module 108 may assign an interface weight that is associated with a particular destination switch to an interface of a source switch based at least in part on (1) the bandwidth of the interface and (2) the paths between the source switch and the destination switch to which the interface connects. After assigning an interface weight that is associated with a particular destination switch to each interface of a source switch, balancing module 108 may use the interface weight assigned to each interface to determine how much of the network traffic forwarded between the source switch and the destination switch should be forwarded via the interface. As used herein, the phrase "interface weight" may refer to any value that may be assigned to an interface that indicates how much of the network traffic that is transmitted between a source switch and a destination switch should be transmitted via the interface in order to balance the network traffic across the paths and/or data links that connect the source switch with the destination switch. In some examples, balancing module 108 may assign interface weights to interfaces of a source switch using the algorithm in Table 1.

If an interface of a source switch connects the source switch to only one path that connects the source switch to a destination switch, balancing module 108 may assign an interface weight that is associated with the destination switch to the interface based on (1) a ratio of the bandwidth of the interface to a sum of the bandwidths of all interfaces that also connect to the path and (2) the ratio of the limiting bandwidth of the path to the sum of the limiting bandwidths of all paths that connect the source switch to the destination switch. In general, balancing module 108 may assign an interface weight that is associated with the destination switch to the interface that is equal to the product of (1) the ratio of the bandwidth of the interface to a sum of the bandwidths of all interfaces that also connect to the path and (2) the ratio of the limiting bandwidth of the path to the sum of the limiting bandwidths of all paths that connect the source switch to the destination switch. When a source switch receives data that should be forwarded to a destination switch, the source switch may select one or more interfaces that connect the source switch to the destination switch on which to forward the data to the destination switch based on the interface weights assigned to the interfaces.

Figure 5:
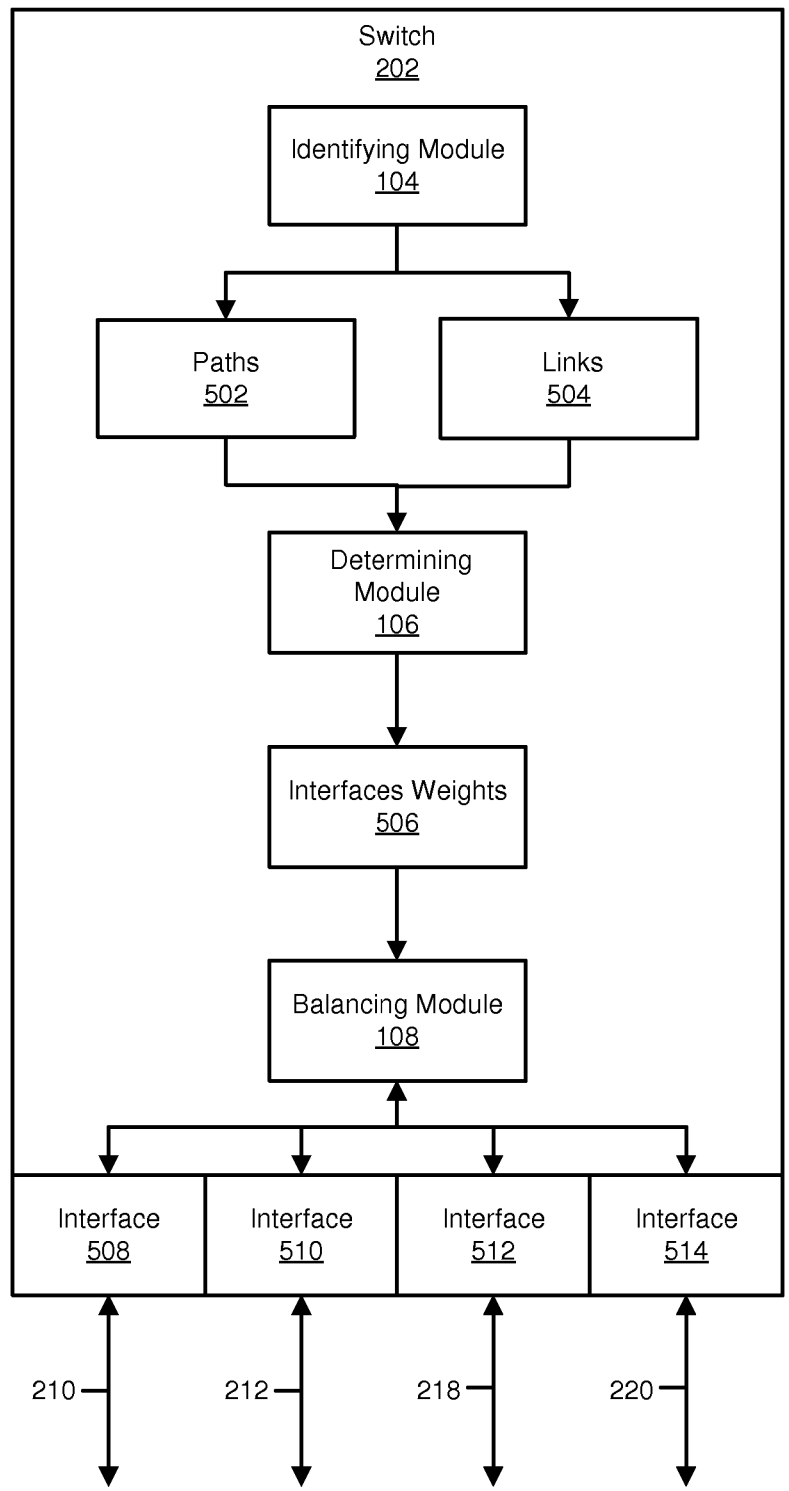
FIG. 5 is a block diagram of an exemplary system for multipath load balancing.

Using FIGS. 3 and 5 as an example, balancing module 108 may assign interface weights to interfaces 508, 512, and 514 that connect switch 202 to the path that connects switch 202 to switch 204 via switch 206 (e.g., the path made up of data links 210, 218, and 220) by first determining that (1) the bandwidths of interfaces 508, 512, and 514 are equal to the respective link bandwidths of data links 210, 218, and 220 (in this example, 10 Gb/s) and (2) the sum of the bandwidths of interfaces 508, 512, and 514 is equal to 30 Gb/s (in this example, 10 Gb/s+10 Gb/s+10 Gb/s=30 Gb/s).

Using this information, balancing module 108 may then assign an interface weight to each of interfaces 508, 512, and 514 that is equal to ⅙ (e.g., the product of (1) the ratio of the bandwidth of each interface to the sum of the bandwidths of all three interfaces (in this example, 10 Gb/s/30 Gb/s=⅓) and (2) the ratio of the limiting bandwidth of the path that connects switch 202 to switch 204 via switch 206 to the sum of the limiting bandwidths of all paths that connect switch 202 to switch 204 (in this example, ½)). In this example, balancing module 108 may, as part of switch 202, use the interface weights assigned to interfaces 508, 512, and 514 to determine that ⅙ of the network traffic transmitted from switch 202 to switch 204 should be transmitted via each of interfaces 508, 512, and 514.

If an interface of a source switch connects the source switch to more than one of the paths that connects the source switch to a destination switch, balancing module 108 may assign an interface weight that is associated with the destination switch to the interface by calculating an interface weight that is associated with the destination switch for the interface for each path (e.g., as if the interface connected the source switch to only one of the paths that connect the source switch to the destination switch, as described above) and (2) summing the resulting interface weights.

As explained above, by load balancing the network traffic transmitted between a source switch and a destination switch using multiple paths, embodiments of the instant disclosure may substantially improve data-link and/or path utilization. Moreover, by load balancing network traffic across multiple paths based on the limiting bandwidths of the paths, embodiments of the instant disclosure may prevent any of the data-links that make up the paths from becoming a bottleneck to network traffic, especially in networks with asymmetric topologies.

Figure 7:
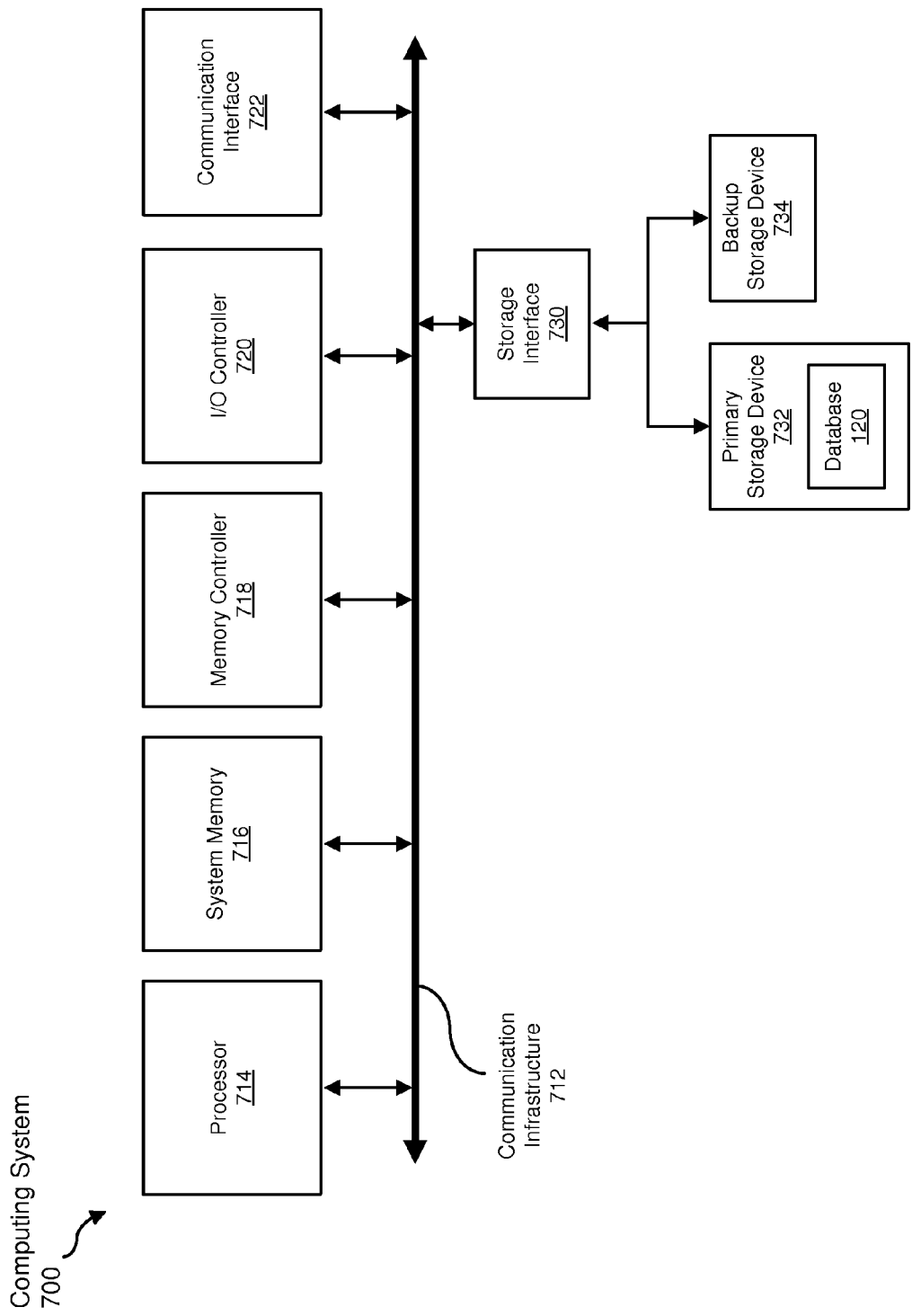
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 4. All or a portion of computing system 700 may also perform and/or be a means for performing and/or implementing any other steps, methods, or processes described and/or illustrated herein. Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. Processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations. In one example, one or more of modules 102 from FIG. 1 may be loaded into system memory 716.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700. In one example, database 120 from FIG. 1 may be stored in primary storage device 732.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying an intermediate switch that connects a source switch to a destination switch, wherein:
        a plurality of shortest paths connect the source switch to the intermediate switch;
        each of the plurality of shortest paths comprises one or more data links;
        a data link connects the intermediate switch directly to the destination switch; and
        each of the one or more data links and the data link has a maximum available link bandwidth;
    assigning, for each shortest path in the plurality of shortest paths, a limiting bandwidth to the shortest path based at least in part on the maximum available link bandwidth of the one or more data links of the shortest path;
    assigning a limiting bandwidth to a shortest path from the source switch to the destination switch through the intermediate switch that is equal to the lowest of the maximum available link bandwidth of the data link and a sum of the limiting bandwidths of the plurality of shortest paths;
    identifying an additional intermediate switch that connects the source switch to the destination switch, wherein:
        an additional plurality of shortest paths connect the source switch to the additional intermediate switch;
        each of the additional plurality of shortest paths comprises one or more additional data links;
        an additional data link connects the additional intermediate switch directly to the destination switch; and
        each of the one or more additional data links and the additional data link has a maximum available link bandwidth;
    assigning, for each shortest path in the additional plurality of shortest paths, a limiting bandwidth to the shortest path based at least in part on the maximum available link bandwidth of the one or more additional data links of the shortest path;
    assigning a limiting bandwidth to an additional shortest path from the source switch to the destination switch through the additional intermediate switch that is equal to the lowest of the maximum available link bandwidth of the additional data link and a sum of the limiting bandwidths of the additional plurality of shortest paths; and
    balancing network traffic that is transmitted from the source switch to the destination switch across the shortest path and the additional shortest path based at least in part on the limiting bandwidth of the shortest path and the limiting bandwidth of the additional shortest path.

2. The method of claim 1, wherein the source switch, the intermediate switch, and the destination switch comprise at least a portion of a virtual-chassis fabric that behaves as a single logical switch.

3. The method of claim 1, wherein balancing the network traffic across the shortest path comprises, for each of a plurality of shortest paths from the source switch to the destination switch:
    assigning a path weight to the path based at least in part on a ratio of the limiting bandwidth of the path to a sum of the limiting bandwidths of all paths in the plurality of shortest paths from the source switch to the destination switch; and using the path weight assigned to the path to transmit a portion of the network traffic via the path.

4. The method of claim 3, wherein using the path weight assigned to the path to transmit the portion of the network traffic via the path comprises:
identifying a plurality of interfaces of the source switch that connect to the path;
for each interface in the plurality of interfaces:
determining a bandwidth of the interface; and
assigning an interface weight to the interface based at least in part on a ratio of the bandwidth of the interface to a sum of the bandwidths of all interfaces in the plurality of interfaces; and
using the interface weight assigned to each interface to balance the portion of the network traffic that is transmitted via the path across the plurality of interfaces.

5. The method of claim 1, wherein balancing the network traffic across the shortest path comprises balancing the network traffic across a plurality of interfaces of the source switch that connect to the plurality of shortest paths.

6. The method of claim 5, wherein balancing the network traffic across the plurality of interfaces of the source switch that connect to the plurality of shortest paths comprises, for each of the plurality of interfaces:
assigning an interface weight to the interface based at least in part on:
a ratio of the bandwidth of the interface to a sum of the bandwidths of all interfaces in the plurality of interfaces that connect to at least one path in the plurality of shortest paths to which the interface connects; and
a ratio of the limiting bandwidth of the at least one path in the plurality of shortest paths to which the interface connects to a sum of the limiting bandwidths of all paths in the plurality of shortest paths; and
using the interface weight assigned to the interface to transmit a portion of the network traffic via the interface.

7. The method of claim 1, wherein the plurality of shortest paths comprise at least every shortest path from the source switch to the intermediate switch.

8. A system comprising:
an identifying module, stored in memory, that:
identifies an intermediate switch that connects a source switch to a destination switch, wherein:
a plurality of shortest paths connect the source switch to the intermediate switch;
each of the plurality of shortest paths comprises one or more data links;
a data link connects the intermediate switch directly to the destination switch; and
each of the one or more data links and the data link has a maximum available link bandwidth; and
identifies an additional intermediate switch that connects the source switch to the destination switch, wherein:
an additional plurality of shortest paths connect the source switch to the additional intermediate switch;
each of the additional plurality of shortest paths comprises one or more additional data links;
an additional data link connects the additional intermediate switch directly to the destination switch; and
each of the one or more additional data links and the additional data link has a maximum available link bandwidth;
a determining module, stored in memory, that:
assigns, for each shortest path in the plurality of shortest paths, a limiting bandwidth to the shortest path based at least in part on the maximum available link bandwidth of the one or more data links of the shortest path;
assigns a limiting bandwidth to a shortest path from the source switch to the destination switch through the intermediate switch that is equal to the lowest of the maximum available link bandwidth of the data link and a sum of the limiting bandwidths of the plurality of shortest paths;
assigns, for each shortest path in the additional plurality of shortest paths, a limiting bandwidth to the shortest path based at least in part on the maximum available link bandwidth of the one or more additional data links of the shortest path; and
assigns a limiting bandwidth to an additional shortest path from the source switch to the destination switch through the additional intermediate switch that is equal to the lowest of the maximum available link bandwidth of the additional data link and a sum of the limiting bandwidths of the additional plurality of shortest paths;
a balancing module, stored in memory, that balances network traffic that is transmitted from the source switch to the destination switch across the shortest path and the additional shortest path based at least in part on the limiting bandwidth of the shortest path and the limiting bandwidth of the additional shortest path; and
at least one physical processor that executes the identifying module, the determining module, and the balancing module.

9. The system of claim 8, wherein the source switch, the intermediate switch, and the destination switch comprise at least a portion of a virtual-chassis fabric that behaves as a single logical switch.

10. The system of claim 8, wherein the balancing module balances the network traffic across the shortest path by, for each of a plurality of shortest paths from the source switch to the destination switch:
assigning a path weight to the path based at least in part on a ratio of the limiting bandwidth of the path to a sum of the limiting bandwidths of all paths in the plurality of shortest paths from the source switch to the destination switch; and
using the path weight assigned to the path to transmit a portion of the network traffic via the path.

11. The system of claim 10, wherein the balancing module uses the path weight assigned to the path to transmit the portion of the network traffic via the path by:
identifying a plurality of interfaces of the source switch that connect to the path;
for each interface in the plurality of interfaces:
determining a bandwidth of the interface; and
assigning an interface weight to the interface based at least in part on a ratio of the bandwidth of the interface to a sum of the bandwidths of all interfaces in the plurality of interfaces; and
using the interface weight assigned to each interface to balance the portion of the network traffic that is transmitted via the path across the plurality of interfaces.

12. The system of claim 8, wherein the balancing module balances the network traffic across the shortest path by balancing the network traffic across a plurality of interfaces of the source switch that connect to the plurality of shortest paths.

13. The system of claim 12, wherein the balancing module balances the network traffic across the plurality of interfaces of the source switch that connect to the plurality of shortest paths by, for each of the plurality of interfaces:
- assigning an interface weight to the interface based at least in part on:
  - a ratio of the bandwidth of the interface to a sum of the bandwidths of all interfaces in the plurality of interfaces that connect to at least one path in the plurality of shortest paths to which the interface connects; and
  - a ratio of the limiting bandwidth of the at least one path in the plurality of shortest paths to which the interface connects to a sum of the limiting bandwidths of all paths in the plurality of shortest paths; and
- using the interface weight assigned to the interface to transmit a portion of the network traffic via the interface.

14. The system of claim 8, wherein the plurality of shortest paths comprise at least every shortest path from the source switch to the intermediate switch.

15. A non-transitory computer-readable medium comprising one or more computer-executable instructions that, when executed by at least one processor of a network device, cause the network device to:
- identify an intermediate switch that connects a source switch to a destination switch, wherein:
  - a plurality of shortest paths connect the source switch to the intermediate switch;
  - each of the plurality of shortest paths comprises one or more data links;
  - a data link connects the intermediate switch directly to the destination switch; and
  - each of the one or more data links and the data link has a maximum available link bandwidth;
- assign, for each shortest path in the plurality of shortest paths, a limiting bandwidth to the shortest path based at least in part on the maximum available link bandwidth of the one or more data links of the shortest path;
- assign a limiting bandwidth to a shortest path from the source switch to the destination switch through the intermediate switch that is equal to the lowest of the maximum available link bandwidth of the data link and a sum of the limiting bandwidths of the plurality of shortest paths;
- identify an additional intermediate switch that connects the source switch to the destination switch, wherein:
  - an additional plurality of shortest paths connect the source switch to the additional intermediate switch;
  - each of the additional plurality of shortest paths comprises one or more additional data links;
  - an additional data link connects the additional intermediate switch directly to the destination switch; and
  - each of the one or more additional data links and the additional data link has a maximum available link bandwidth;
- assign, for each shortest path in the additional plurality of shortest paths, a limiting bandwidth to the shortest path based at least in part on the maximum available link bandwidth of the one or more additional data links of the shortest path;
- assign a limiting bandwidth to an additional shortest path from the source switch to the destination switch through the additional intermediate switch that is equal to the lowest of the maximum available link bandwidth of the additional data link and a sum of the limiting bandwidths of the additional plurality of shortest paths; and
- balance network traffic that is transmitted from the source switch to the destination switch across the shortest path and the additional shortest path based at least in part on the limiting bandwidth of the shortest path and the limiting bandwidth of the additional shortest path.

16. The non-transitory computer-readable medium of claim 15, wherein the source switch, the intermediate switch, and the destination switch comprise at least a portion of a virtual-chassis fabric that behaves as a single logical switch.

17. The non-transitory computer-readable medium of claim 15, wherein the one or more computer-executable instructions, when executed by the processor of the network device, cause the network device to balance the network traffic across the shortest path by, for each of a plurality of shortest paths from the source switch to the destination switch:
- assigning a path weight to the path based at least in part on a ratio of the limiting bandwidth of the path to a sum of the limiting bandwidths of all paths in the plurality of shortest paths from the source switch to the destination switch; and
- using the path weight assigned to the path to transmit a portion of the network traffic via the path.

18. The non-transitory computer-readable medium of claim 17, wherein the one or more computer-executable instructions, when executed by the processor of the network device, cause the network device to use the path weight assigned to the path to transmit the portion of the network traffic via the path by:
- identifying a plurality of interfaces of the source switch that connect to the path;
- for each interface in the plurality of interfaces:
  - determining a bandwidth of the interface; and
  - assigning an interface weight to the interface based at least in part on a ratio of the bandwidth of the interface to a sum of the bandwidths of all interfaces in the plurality of interfaces; and
- using the interface weight assigned to each interface to balance the portion of the network traffic that is transmitted via the path across the plurality of interfaces.

* * * * *